United States Patent
Wu et al.

(10) Patent No.: US 10,798,693 B2
(45) Date of Patent: Oct. 6, 2020

(54) METHOD FOR CONFIRMING UPLINK SEMI-PERSISTENT SCHEDULING DEACTIVATION AND TERMINAL DEVICE

(71) Applicant: Nokia Technologies Oy, Espoo (FI)

(72) Inventors: Chunli Wu, Beijing (CN); Esa Mikael Malkamaki, Espoo (FI); Jari Petteri Lunden, Espoo (FI); Elena Virtej, Espoo (FI)

(73) Assignee: Nokia Technologies Oy, Espoo (FI)

( * ) Notice: Subject to any disclaimer, the term of this patent is extended or adjusted under 35 U.S.C. 154(b) by 16 days.

(21) Appl. No.: 16/088,421

(22) PCT Filed: Apr. 1, 2016

(86) PCT No.: PCT/CN2016/078393
§ 371 (c)(1),
(2) Date: Sep. 25, 2018

(87) PCT Pub. No.: WO2017/166322
PCT Pub. Date: Oct. 5, 2017

(65) Prior Publication Data
US 2019/0090222 A1  Mar. 21, 2019

(51) Int. Cl.
*H04W 72/04* (2009.01)
(52) U.S. Cl.
CPC ....... *H04W 72/042* (2013.01); *H04W 72/044* (2013.01); *H04W 72/0406* (2013.01)
(58) Field of Classification Search
None
See application file for complete search history.

(56) References Cited

U.S. PATENT DOCUMENTS 9,178,667 B2 * 11/2015 Hsu .................. H04L 1/1893
2010/0111026 A1 * 5/2010 Hsu .................. H04L 1/1893
370/329

(Continued)

FOREIGN PATENT DOCUMENTS

WO  2010/031470 A1  3/2010
WO  2010/055996 A1  5/2010
WO  2010/088680 A1  8/2010

OTHER PUBLICATIONS

"New WI Proposal: L2 Latency Reduction Techniques for LTE", 3GPP TSG-RAN meeting #71, RP-160667, Agenda: 10.1.2, Ericsson, Month 07-10, 2016, 8 pages.

(Continued)

*Primary Examiner* — Michael J Moore, Jr.
(74) *Attorney, Agent, or Firm* — Harrington & Smith

(57) ABSTRACT

Embodiments of the present disclosure relate to a method for confirming uplink semi-persistent scheduling deactivation and a terminal device. In example embodiments, an indication of uplink semi-persistent scheduling deactivation is received from a base station while the terminal device stores data available for uplink transmission. Then, confirmation of the deactivation is sent to the base station. Such confirmation of the deactivation may notify the base station that the terminal device has received the indication of the uplink semi-persistent scheduling deactivation and further that the uplink semi-persistent scheduling will be deactivated at the terminal device.

14 Claims, 3 Drawing Sheets

(56) References Cited

U.S. PATENT DOCUMENTS

| | | | | |
|---|---|---|---|---|
| 2010/0118807 A1* | 5/2010 | Seo | .................. | H04L 5/0085 370/329 |
| 2010/0150089 A1* | 6/2010 | Yu | .................. | H04L 5/0055 370/329 |
| 2010/0202389 A1* | 8/2010 | Cai | .................. | H04W 72/042 370/329 |
| 2011/0223924 A1* | 9/2011 | Lohr | .................. | H04W 72/042 455/450 |
| 2013/0083702 A1* | 4/2013 | Barany | .................. | H04W 28/06 370/261 |
| 2013/0258914 A1* | 10/2013 | Seo | .................. | H04L 1/1896 370/280 |
| 2018/0184444 A1* | 6/2018 | Li | .................. | H04L 5/0094 |

OTHER PUBLICATIONS

"3rd Generation Partnership Project; Technical Specification Group Radio Access Network; Evolved Universal Terrestrial Radio Access (E-UTRA); Study on latency reduction techniques for LTE (Release 13)", 3GPP TR 36.881, V0.6.0, Feb. 2016, pp. 1-92.

"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321, V13.0.0, Dec. 2015, pp. 1-82.

International Search Report and Written Opinion received for corresponding Patent Cooperation Treaty Application No. PCT/CN2016/078393, dated Jan. 5, 2017, 12 pages.

"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321, V12.9.0, Mar. 2016, pp. 1-77.

Extended European Search Report received for corresponding European Patent Application No. 16896101.9, dated Sep. 25, 2019, 9 pages.

"Missing Details of Semi-persistent Scheduling for UL", 3GPP TSG-RAN WG2 Meeting #63bis, R2-085070, Agenda : 6.1.1.8, Nokia Corporation, Sep. 29-Oct. 3, 2008, 3 pages.

"SPS Release Issues", 3GPP TSG-RAN WG2 #64, R2-086091, Agenda : 6.1.1.9, HTC Corporation, Sep. 29-Oct. 3, 2008, pp. 1-3.

* cited by examiner

METHOD FOR CONFIRMING UPLINK SEMI-PERSISTENT SCHEDULING DEACTIVATION AND TERMINAL DEVICE

RELATED APPLICATION

This application was originally filed as PCT Application No. PCT/CN2016/078393 filed Apr. 1, 2016.

TECHNICAL FIELD

Embodiments of the present disclosure generally relate to the field of telecommunication, and in particular, to a method for confirming uplink semi-persistent scheduling deactivation and a terminal device.

BACKGROUND

Most efforts have been made in latency reduction of a Long Term Evolution (LTE) system, especially in a user plane. Prescheduling approaches have been proposed to enable fast initiation of uplink (UL) transmission. With the prescheduling approaches, an eNB may preschedule UL resources for user equipment (UE) without receiving a scheduling request (SR) from the UE. The prescheduled resources are typically specific to the UE and valid for a predetermined time period. During the time period, the UE may initiate the UL transmission whenever it stores data available for transmission.

Semi-persistent scheduling (SPS) is one of such prescheduling approaches. In UL SPS, the eNB configures UL SPS periodicity with RRC signaling. The SPS resources that are specific to the UE and valid every SPS period, e.g., 10 ms and 1 ms, for example are given in SPS activation UL grant sent on PDCCH. After that, the UE persistently has UL grants with SPS periodicity. If the UE has data to be transmitted to the eNB, the UE may directly use the UL SPS resources to initiate UL transmission without sending SR. Conventionally, the UE has to always use the UL grants. Even if the UE has no data to be transmitted, the UE has to send an empty padding buffer status report (BSR) to indicate its empty buffer status to the eNB.

This invention relates to LTE latency reduction, more specifically lowering the user plane latency for the scheduled UL transmission. This solution targets active UEs or UEs that have been inactive a longer time, but are kept in RRC connected state.

SPS—resources are UE specific. In legacy behavior, the SPS resource periodicity was 10 ms or longer, but as outcome of the latency reduction study item from last year one of the agreement was that it would be beneficial to have an SPS periodicity of 1 ms. SPS is configured by RRC signaling and activated/deactivated by PDCCH. With SPS it means there is a persistent grant that is given once and is valid persistently (until deactivated) with the configured periodicity, so that there is no need to send on PDCCH new allocation/grant for each transmission.

Pre-scheduling (eNB scheduling the UE without receiving a scheduling request (SR) from the UE)—resources are UE specific and UE is given a new UL grant that is valid for that single TTI. Pre-scheduling scheme supported by current specifications allows that eNB gives UL grant for each UE in each pre-scheduling interval, and the assigned UL grant will be wasted if the UE has no available data to transmit when receiving the UL grant.

The problem with both of these pre-scheduling approaches is that even if UE has no data, once the UL grant is received UE has to send in UL padding BSR MAC CE and padding. Therefore one of the main outcome of the latency reduction SI, stated in the TR 36.881, is that: 'It is beneficial to allow UEs to skip (most) dynamic and configured uplink grants if no data is available for transmission. With frequent UL grants, allowing skipping UL grants may decrease UL interference and improve UE battery efficiency. The UE will continue to send one or more regular MAC CE(s), if any. The eNB may enable skipping UL grants by RRC dedicated signaling.'

SUMMARY

In general, example embodiments of the present disclosure provide a method for confirming uplink semi-persistent scheduling deactivation and a terminal device.

In a first aspect, a method implemented in a terminal device is provided. According to the method, an indication of uplink semi-persistent scheduling deactivation is received from a base station. Then, confirmation of the deactivation is sent to the base station. A computer program product for carrying out this method is also provided.

In a second aspect, a terminal device is provided. The terminal device comprises: an indication receiving unit configured to receive from a base station an indication of uplink semi-persistent scheduling deactivation; and a confirmation sending unit configured to send to the base station confirmation of the deactivation.

In a third aspect, a terminal device is provided. The terminal device comprises a receiver configured to receive from a base station an indication of uplink semi-persistent scheduling deactivation; and a transmitter configured to send to the base station confirmation of the deactivation.

Through the following description, it would be appreciated that, according to embodiments of the present disclosure, in the case that the terminal device stores data available for uplink transmission, the terminal device sends to the base station the confirmation of the uplink semi-persistent scheduling deactivation. In this way, the base station may be notified that the terminal device has received the indication of the uplink semi-persistent scheduling deactivation and further that the semi-persistent scheduling will be deactivated at the terminal device.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION

Principle of the present disclosure will now be described with reference to some example embodiments. It is to be understood that these embodiments are described only for the purpose of illustration and helping those skilled in the art to understand and implement the present disclosure, without suggesting any limitations as to the scope of the disclosure. The disclosure described herein can be implemented in various manners other than those describe below.

As used herein, the term "terminal device" or "user equipment" (UE) refers to any device capable of wireless communications. Examples of such a device include, but are not limited to, a Mobile Terminal (MT), a Subscriber Station (SS), a Portable Subscriber Station (PSS), a Mobile Station (MS), or an Access Terminal (AT). Implementations of the device include, but are not limited to, mobile phones, cellular phones, cell phones, smart phones, personal digital assistants (PDAs), portable computers, lap tops, Global Positioning System (GPS) devices, image capture devices such as digital cameras, gaming devices, music storage and playback appliances, any portable units or terminals that have wireless communication capabilities, or Internet appliances enabling wireless Internet access and browsing and the like. In addition, in the context of the present disclosure, the terms "terminal device" or "user equipment" (UE) can be used interchangeably for ease of discussion.

As used herein, the term "base station" (BS) refers to a device which is capable of providing or hosting a cell to which one or more terminal devices can access. Examples of a BS include, but are not limited to, a Node B (NodeB or NB), an Evolved NodeB (eNodeB or eNB), a Remote Radio Unit (RRU), a radio header (RH), a remote radio head (RRH), a relay, a low power node such as a femto, a pico, and the like.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
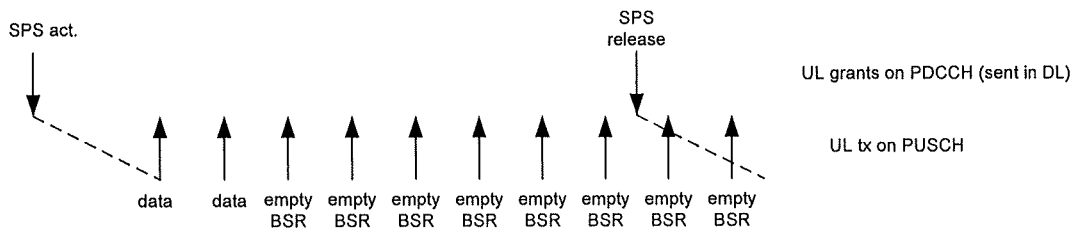
FIG. 1 shows legacy behavior of SPS activation and release as well as SPS UL transmissions.

In the current 3GPP standard, UE is supposed to always use the UL grant, dynamic or configured (SPS). Thus when UL SPS is activated, UE is always using the UL grant and transmitting a MAC PDU. If the UE is not having data, then it sends an empty padding BSR (i.e., a BSR indicating empty buffer). Thus eNB can easily detect that the UE has received the PDCCH activating the SPS. Also, the PDCCH deactivating or releasing the SPS can be easily detected when UE stops using the SPS UL grant. See FIG. 1 where arrows pointing down represent UL grants sent on DL PDCCH and arrows pointing up represent UL transmissions on PUSCH using the SPS (=configured) UL grants. FIG. 1 shows legacy behavior of SPS activation and release as well as SPS UL transmissions.

Figure 2:
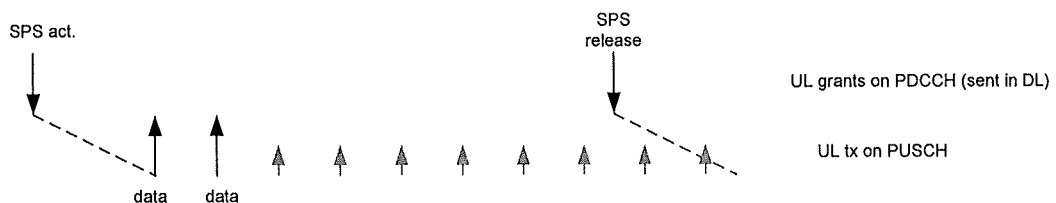
FIG. 2 shows new behavior to be specified in Rel-14.
Figure 3:
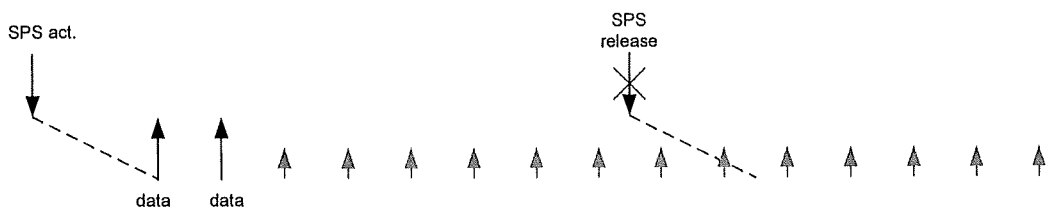
FIG. 3 shows new behavior when SPS release is not correctly received by the UE.

It has been agreed that in Rel-14 a new feature will be specified: the UE does not (always) use the UL grant, if it does not have UL data to transmit, i.e., the buffer is empty. When the UE does not anymore always respond to an UL grant by transmitting something (at least an empty padding BSR), eNB cannot be sure whether the UE has received the PDCCH activating the SPS or especially the PDCCH releasing the SPS resource. If the UE has no data it will not transmit anything even if it assumed that it still has UL SPS grant. Thus eNB does not know whether UE received PDCCH releasing the SPS UL grant and therefore stopped transmitting or whether the UE simply does not have any data and therefore is not transmitting anything, see FIGS. 2 and 3. The arrows pointing down represent UL grants sent on DL PDCCH and arrows pointing up represent UL transmissions on PUSCH using the SPS (=configured) UL grants and small grey arrows represent SPS (configured) UL grants that are not used. FIG. 2 shows new behavior to be specified in Rel-14. FIG. 3 shows new behavior when SPS release is not correctly received by the UE.

Comparing FIGS. 2 and 3, the problem can be seen: eNB does not know whether the UE has received the SPS release or not since the UE behaviour is the same: UE is not transmitting anything. eNB does not know whether UE still has the SPS resource (that is not used due to lack of data) or whether the UE has released the SPS resource.

The probability of PDCCH loss is typically in the order of 1%. When eNB sends the deactivation of SPS on PDCCH, there is thus a reasonably high chance that UE will not be able to correctly decode/receive it. In that case, as SPS is having 1 ms periodicity and it is intended to be used for fast initiation of UL traffic instead of using the SR procedure, there is a high chance of UE interfering at some point, as it does not know that it should not use anymore the SPS resources. There is also additional latency if the UE attempts to use the SPS resource for UL traffic as the eNB is not expecting to receive on that resource. And because the UE has the UL grant in every TTI, it cannot send the scheduling request.

Thus it would be beneficial to have feedback from the UE for SPS deactivation (release) command. So, one question that needs to be answered is how the eNB should be made aware of the fact that UE has not correctly received the deactivation command for SPS and it continues using SPS resources.

As described above, with the SPS, the eNB may assign an UL grant to the UE without receiving the SR from the UE. During the validity period of the UL grant, even if the UE has no data, the UE has to send the empty padding BSR to the eNB. Transmission of the empty padding BSR may cause UL interferences and increase UE power consumption. A proposal to deal with this issue is to allow the UE to skip the UL grants. In particular, when the UE has no UL data to be transmitted, the UE may transmit nothing even if the UL grant is still valid.

However, such a proposal may result in some uncertainty at the eNB when the eNB sends to the UE an indication of UL SPS deactivation (or release). For example, the eNB may not determine whether the UE stops UL transmission in response to receiving the indication of the deactivation or having no data available for the transmission. Accordingly, the eNB does not know whether the UE has deactivated the semi-persistently scheduled resources or not. From the perspective of the UE, if the UE does not receive the indication of the deactivation and still uses the semi-persistently scheduled resources, UL interferences and additional latency may be induced because the eNB is unaware of the losing of the indication of the deactivation.

Conventionally, it has been proposed to use physical (PHY) acknowledgement (ACK) as confirmation of uplink (UL) SPS deactivation. However, it is difficult to use the PHY ACK as the confirmation of the UL SPS deactivation because there exists no mechanism to send ACK for an UL grant on Physical Uplink Control Channel (PUCCH).

In order to solve the above and other potential problems of the conventional approaches, embodiments of the present disclosure provide a method for confirming the UL SPS deactivation. According to embodiments of the present disclosure, if the terminal device receives from the base station an indication of UL SPS deactivation, the terminal device sends to the base station confirmation of the deactivation. In this way, the base station may be notified that the terminal device has received the indication of the UL SPS deactivation and further that the UL SPS will be deactivated at the terminal device.

Figure 4:
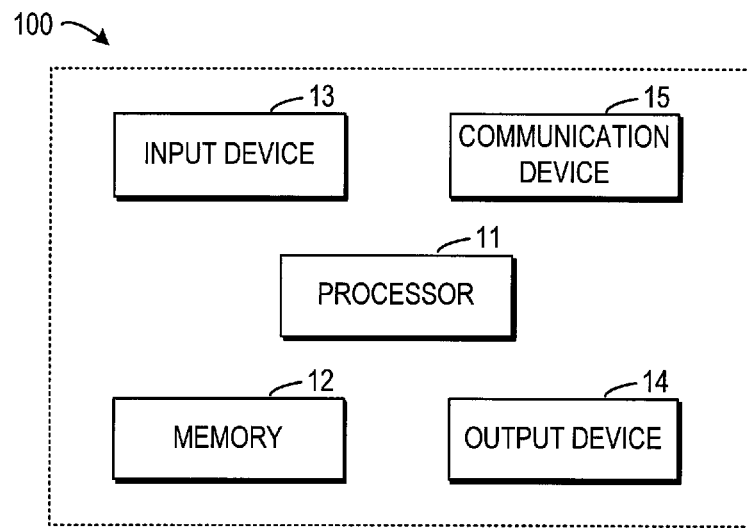
FIG. 4 is a block diagram showing a terminal device suitable for implementing embodiments of the present disclosure.

FIG. 4 is a block diagram showing a terminal device 100 suitable for implementing embodiments of the present disclosure. It should be understood, however, that a terminal device as illustrated and hereinafter described is merely illustrative of a terminal device that could benefit from embodiments of the invention, and therefore, should not be taken to limit the scope of the invention. While the terminal device 100 is illustrated and will be hereinafter described for purposes of example, other types of terminal devices may readily employ embodiments of the invention. The terminal device 100 may be a personal digital assistant (PDAs), a pager, a mobile computer, a desktop computer, a television, a gaming apparatus, a laptop computer, a tablet computer, a media player, a camera, a video recorder, a mobile phone, and/or a global positioning system (GPS) apparatus. Moreover, the terminal device of at least one example embodiment need not be the entire terminal device, but may be a component or group of components of the terminal device in other example embodiments. For example, the terminal device may be an integrated circuit, a set of integrated circuits, and/or the like.

Furthermore, terminal devices may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, the terminal device 100 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the terminal device 10 to implement one or more functions of the terminal device 100, such as the functions described herein. In at least one example embodiment, memory 12 includes computer program code such that the memory and the computer program code are configured to, working with the processor, cause the apparatus to perform one or more actions described herein.

The terminal device 100 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, such as LTE, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the terminal device 100 among these devices according to their respective capabilities. The processor 11 thus may comprise the functionality to encode and interleave message and data prior to modulation and transmission. The processor 1 may additionally comprise an internal voice coder, and may comprise an internal data modem.

Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the terminal device 10 to transmit and receive internet content, such as location-based content and/or other web page content, according to a Transmission Control Protocol (TCP), Internet Protocol (IP), User Datagram Protocol (UDP), Internet Message Access Protocol (EVIAP), Post Office Protocol (POP), Simple Mail Transfer Protocol (SMTP), Wireless Application Protocol (WAP), Hypertext Transfer Protocol (HTTP), and/or the like, for example.

The terminal device 100 may comprise a user interface for providing output and/or receiving input. The terminal device 100 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The terminal device may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may relate to information that conveys information indicative of the input, indicative of an aspect of the input indicative of occurrence of the input, and/or the like.

The terminal device 100 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the terminal device 10. For example, the keypad may comprise a conventional QWERTY keypad arrangement. The keypad may also comprise various soft keys with associated functions. In addition, or alternatively, the terminal device 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the terminal device 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 5:
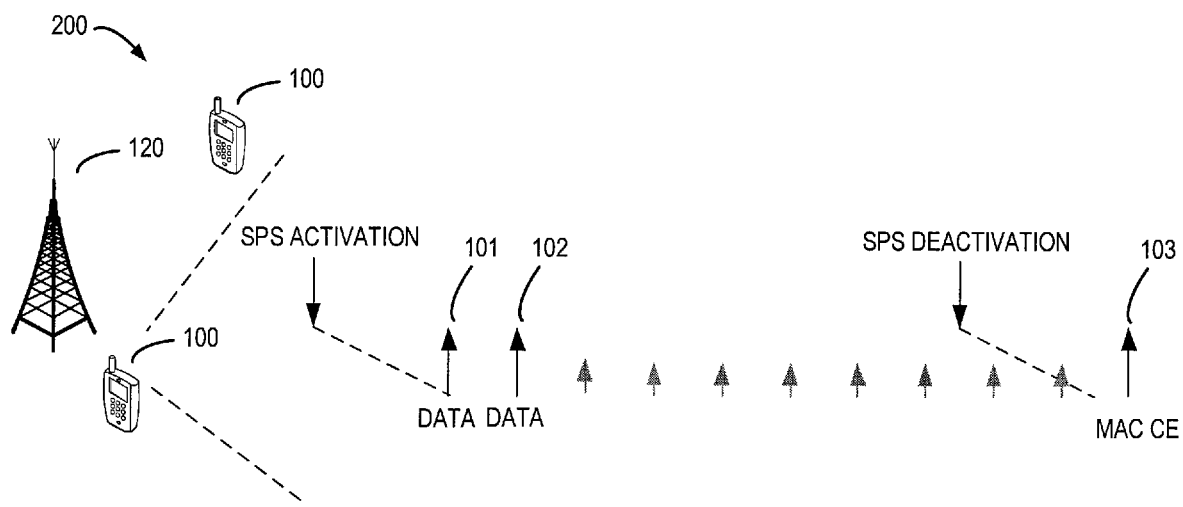
FIG. 5 is an example environment in which embodiments of the present disclosure can be implemented.

FIG. 5 shows an example environment 200 in which embodiments of the present disclosure can be implemented. The environment 200, which is a part of a communication network, includes one or more terminal devices 100 and one or more base stations 120. In the environment 200, the terminal devices 100 may communicate with the base stations 120 or with each other. For the sake of discussion, the terminal device will be referred to as the UE, and the base station will be referred to as the eNB. It is to be understood that although two UEs 100 and one eNB 120 are shown, this is only for the purpose of illustration without suggesting any limitations as to the scope of the present disclosure. The environment 200 may include any suitable number of the UEs 100 and eNBs 120.

After the UL SPS is activated by the eNB 120 for the UE 100, the UE 100 may use the semi-persistently scheduled resources to transmit UL data. As shown, the UE 100 uses the first and second UL grants to transmit UL data in corresponding time transmission intervals (TTIs) 101 and 102. For subsequent UL grants, the UE transmits nothing. Then, the UE 100 receives from the eNB 120 an indication of the SPS deactivation. According to embodiments of the present disclosure, the UE 100 sends confirmation of the deactivation to the eNB 120 in the TTI 103. In this example, the confirmation of the deviation is sent as a Media Access Control (MAC) control element (CE). Other implementations are possible as will be discussed in the following paragraphs.

Figure 6:
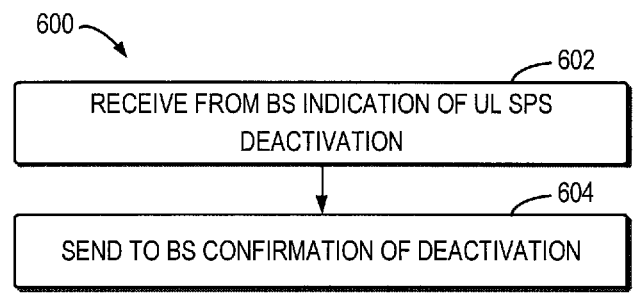
FIG. 6 is a flowchart of an example method for confirming UL SPS deactivation in accordance with some embodiments of the present disclosure.

FIG. 6 shows a flowchart of an example method 600 for confirming UL SPS deactivation in accordance with some embodiments of the present disclosure. The method 600 can be implemented in the terminal device (for example, UE) 100. For the sake of discussion, the method 600 will be described with reference to FIG. 5.

In step 602, the UE 100 receives from the eNB 120 an indication of UL SPS deactivation. Next, in step 604, the UE 100 sends to the eNB 120 confirmation of the deactivation. According to embodiments of the present disclosure, the confirmation may be implemented in any suitable forms. In some embodiments, as shown in FIG. 2, the confirmation of the deactivation may be implemented as a MAC CE. The MAC CE may be a new MAC CE that is especially predefined. It could be called, e.g., SPS release confirmation MAC control element. The new MAC CE acting as the confirmation may be identified by a MAC Protocol Data Unit (PDU) sub-header thereof. For example, the sub-header may have a specific field. Logical Channel Identity (LCID) with specified bits may be an example implementation of the specific field. The specified bits may be selected as certain bits (for example, 10101) that have been reserved in the standards for future use. It is to be understood that the new MAC CE may be identified in any other suitable ways. The scope of the present disclosure will not be limited in this regard.

Alternatively, the MAC CE may be an existing MAC CE which is normally not sent from the UE 100 to the eNB 120 in this stage. After the eNB 120 sends the indication of the UL SPS deactivation to the UE 120, the eNB 120 may consider the existing MAC CE received from the UE 100 as the confirmation of the deactivation. An example of such existing MAC CE could be C-RNTI MAC CE which is normally used only during the random access procedure. As described above, other implementations of the confirmation of the deactivation are possible. For example, the confirmation may be implemented with a data packet in a specified format. The scope of the present disclosure will not be limited in this regard.

According to embodiments of the present disclosure, the confirmation of the deactivation, such as the MAC CE, may be sent using any suitable UL resources. In some embodiments, the sending of the confirmation may be based on UL resources that are semi-persistently scheduled by the eNB 120 for the UE 100. For example, the UE 100 may use the UL SPS resources to send the confirmation of the deactivation to notify the eNB 120 that the UE 100 has received the indication of the UL SPS deactivation. Since the UL SPS resources have been configured and activated by the eNB 120 for the UE 100, the transmission of the confirmation on the UL SPS resources is convenient and efficient. After sending the confirmation to the eNB 120, the UE 100 may deactivate the UL SPS resources. In this way, the UE 100 and the eNB 120 may perform matching processes after the UL SPS deactivation. It should be noted that according to the current standard specification, UL SPS resource cannot be used anymore after receiving the SPS deactivation (release) command. Here, it is proposed that the UL SPS resource is still used once after receiving the SPS deactivation command to send the confirmation of the deactivation (release). In one example embodiment, the transmission of the new MAC CE can use for example any UL grant following the release of the SPS UL grant, i.e., it can also be sent using a dynamic UL grant, if available. PDCCH releasing the UL SPS could also contain a small UL grant for sending the new MAC CE.

In one embodiment, UE would send the SPS release confirmation MAC CE using the SPS resource to be deactivated (e.g. together with a buffer status report BSR). Once the SPS release confirmation MAC CE has been sent, UE would stop using the SPS resource. The SPS release confirmation MAC CE may be prioritized over other MAC CEs, e.g. regular BSR in case there is UL data in the buffer. Note that the same MAC CE could be used for SPS activation confirmation as well to confirm correction reception of SPS activation command.

This could be captured in 3GPP Technical Specification TS 36.321 for example as follows (the new behavior is shown underlined; for definitions of acronyms or meanings of abbreviations, please refer to TS 36.321). In Section 5.4.1 "UL Grant reception":

In order to transmit on the UL-SCH the MAC entity must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers.

If the MAC entity has a C-RNTI, a Semi-Persistent Scheduling C-RNTI, or a Temporary C-RNTI, the MAC entity shall for each TTI and for each Serving Cell belonging to a TAG that has a running timeAlignmentTimer and for each grant received for this TTI:
  if an uplink grant for this TTI and this Serving Cell has been received on the PDCCH for the MAC entity's C-RNTI or Temporary C-RNTI; or
  if an uplink grant for this TTI has been received in a Random Access Response:
    if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant:
      consider the New Data Indicator (NDI) to have been toggled for the corresponding HARQ process regardless of the value of the NDI.
    deliver the uplink grant and the associated HARQ information to the HARQ entity for this TTI.
  else, if this Serving Cell is the SpCell and if an uplink grant for this TTI has been received for the SpCell on the PDCCH of the SpCell for the MAC entity's Semi-Persistent Scheduling C-RNTI:
    if the New Data Indicator (NDI) in the received HARQ information is 1:
      consider the NDI for the corresponding HARQ process not to have been toggled;
      deliver the uplink grant and the associated HARQ information to the HARQ entity for this TTI.
    else if the NDI in the received HARQ information is 0:
      if PDCCH contents indicate SPS release:
        trigger an SPS release confirmation MAC Control Element;
        if an uplink grant for this TTI has been configured for the SpCell:
          consider the NDI bit for the corresponding HARQ process to have been toggled;
          deliver the configured uplink grant and the associated HARQ information to the HARQ entity for this TTI;
          clear the configured uplink grant (if any).
      else:
        store the uplink grant and the associated HARQ information as configured uplink grant;
        initialise (if not active) or re-initialise (if already active) the configured uplink grant to start in this TTI and to recur according to rules in subclause 5.10.2;
        consider the NDI bit for the corresponding HARQ process to have been toggled;
        deliver the configured uplink grant and the associated HARQ information to the HARQ entity for this TTL
  else, if this Serving Cell is the SpCell and an uplink grant for this TTI has been configured for the SpCell:

consider the NDI bit for the corresponding HARQ process to have been toggled;

deliver the configured uplink grant, and the associated HARQ information to the HARQ entity for this TTI.

NOTE: The period of configured uplink grants is expressed in TTIs.

NOTE: If the MAC entity receives both a grant in a Random Access Response and a grant for its C-RNTI or Semi persistent scheduling C-RNTI requiring transmissions on the SpCell in the same UL subframe, the MAC entity may choose to continue with either the grant for its RA-RNTI or the grant for its C-RNTI or Semi persistent scheduling C-RNTI.

NOTE: When a configured uplink grant is indicated during a measurement gap and indicates an UL-SCH transmission during a measurement gap, the MAC entity processes the grant but does not transmit on UL-SCH.

In Section 5.4.3.1 "Logical channel prioritization":

The Logical Channel Prioritization procedure is applied when a new transmission is performed.

RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD).

The MAC entity shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The MAC entity shall perform the following Logical Channel Prioritization procedure when a new transmission is performed:

The MAC entity shall allocate resources to the logical channels in the following steps:

Step 1: All the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s);

Step 2: the MAC entity shall decrement Bj by the total size of MAC SDUs served to logical channel j in Step 1

NOTE: The value of Bj can be negative.

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources of the associated MAC entity;

if the UE segments an RLC SDU from the logical channel, it shall maximize the size of the segment to fill the grant of the associated MAC entity as much as possible;

the UE should maximise the transmission of data.

if the MAC entity is given an UL grant size that is equal to or larger than 4 bytes while having data available for transmission, the MAC entity shall not transmit only padding BSR and/or padding (unless the UL grant size is less than 7 bytes and an AMD PDU segment needs to be transmitted).

The MAC entity shall not transmit data for a logical channel corresponding to a radio bearer that is suspended (the conditions for when a radio bearer is considered suspended are defined in [8]).

For the Logical Channel Prioritization procedure, the MAC entity shall take into account the following relative priority in decreasing order:

MAC control element for C-RNTI or data from UL-CCCH;

MAC control element for SPS release confirmation;

MAC control element for BSR, with exception of BSR included for padding;

MAC control element for PHR, Extended PHR, or Dual Connectivity PHR;

MAC control element for Sidelink BSR, with exception of Sidelink BSR included for padding;

data from any Logical Channel, except data from UL-CCCH;

MAC control element for BSR included for padding;

MAC control element for Sidelink BSR included for padding.

In Section 5.10.2 "Uplink":

After a Semi-Persistent Scheduling uplink grant is configured, the MAC entity shall:

if twoIntervalsConfig is enabled by upper layer:

set the Subframe_Offset according to Table 7.4-1.

else:

set Subframe_Offset to 0.

consider sequentially that the $N^{th}$ grant occurs in the subframe for which:

(10*$SFN$+subframe)=[(10*$SFN_{start\ time}$+ subframe$_{start\ time}$)+$N$* semiPersistSchedInterval$UL$+Subframe_Offset*($N$ modulo 2)] modulo 10240.

Where $SFN_{start\ time}$ and subframe$_{start\ time}$ are the SFN and subframe, respectively, at the time the configured uplink grant were (re-)initialised.

The MAC entity shall clear the configured uplink grant immediately after implicitReleaseAfter [8] number of consecutive new MAC PDUs each containing zero MAC SDUs have been provided by the Multiplexing and Assembly entity, on the Semi-Persistent Scheduling resource.

The MAC entity shall clear the configured uplink grant immediately after transmitting an SPS release confirmation MAC Control Element.

NOTE: Retransmissions for Semi-Persistent Scheduling can continue after clearing the configured uplink grant.

Furthermore, Section 6.1.3.10 "SPS release confirmation MAC Control Element" may be added for example as follows:

The SPS release confirmation MAC control element is identified by a MAC PDU subheader with LCID as specified in table 6.2.1-1.

It has a fixed size of zero bits.

In addition, Table 6.2.1-2 "Values of LCID for UL-SCH" may be modified for example as follows:

TABLE 6.2.1-2

Values of LCID for UL-SCH

| Index | LCID values |
| --- | --- |
| 00000 | CCCH |
| 00001-01010 | Identity of the logical channel |
| 01011 | CCCH |
| 01100-10100 | Reserved |
| 10101 | SPS release confirmation |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In an alternative embodiment the SPS deactivation signaling on PDCCH indicates the resource the UE should use for sending the SPS release/deactivation confirmation MAC CE. In this case the contents of PDCCH indicating the SPS release should be changed: the resource allocation should be there but that can be very limited, allocating, e.g., only one PRB, the same applies for MCS (modulation and coding scheme), only the most robust one could be used here.

When the new SPS release on PDCCH with small resource allocation for the SPS release confirmation MAC CE is received, the MAC operation could be similar to the above except that instead of delivering the 'configured uplink grant', the just received uplink grant would be delivered to the HARQ entity.

In case that the SPS release confirmation MAC CE does not go through (sent with SPS resource), UE can use the normal SPS HARQ re-transmissions with the dynamic grant on PDCCH (i.e. normal scheduled adaptive retransmissions), or non-adaptive retransmissions.

In addition to the semi-persistently scheduled UL resources, in other embodiments, the UE 100 may use UL resources dynamically scheduled for the confirmation of the deactivation. As an example, the eNB 120 may schedule an UL resource dedicated to the confirmation of the deactivation and include the UL resource in the indication of the UL SPS deactivation. In order to save limited UL resources and signaling overhead, the scheduled UL resource may include, for instance, only one physical resource block (PRB). In this example, the UE 100 may obtain the uplink resource from the received indication of the UL SPS deactivation and then send the confirmation of the deactivation using the obtained UL resource.

As an alternative example, the eNB 120 may schedule an UL resource in response to receiving a scheduling request (SR) from the UE 100. For example, after the UE 100 receives the indication of the UL SPS deactivation from the eNB 120, the UE 100 may send to the eNB 120 a request for scheduling the UL resource for the confirmation of the deactivation. Upon the reception of the request, the eNB 120 may schedule the uplink resource and send the scheduled UL resource to the UE 100. Accordingly, the UE 100 may receive the scheduled UL resource from the eNB 120 and then send to the eNB 120 the confirmation of the deactivation using the scheduled UL resource.

After the UE 100 sends the confirmation, the method 600 may further comprise abstaining from the UL transmission of the data stored locally. It is to be understood that the transmission abstaining is optional. In some embodiments, the UE 100 may transmit the data before deactivating the UL SPS. It is also to be understood that the transmission abstaining and the sending of the confirmation of the deactivation may be performed in any suitable orders. For example, they may be performed in parallel or in sequence.

Figure 7:
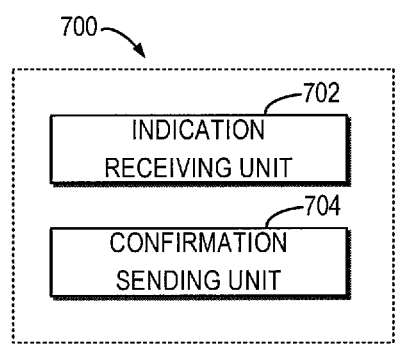
FIG. 7 is a block diagram of a terminal device in accordance with some embodiments of the present disclosure.

FIG. 7 shows a block diagram of a terminal device 700 in accordance with some embodiments of the present disclosure. The terminal device 700 can be considered as an example implementation of the terminal device 100 as shown in FIG. 4.

As shown, the terminal device 700 comprises an indication receiving unit 702 configured to receive from a base station an indication of uplink SPS deactivation; and a confirmation sending unit 704 configured to send to the base station confirmation of the deactivation.

In some embodiments, the terminal device 700 may further comprise a first resource obtaining unit configured to obtain an uplink resource that is semi-persistently scheduled by the base station for the terminal device. In these embodiments, the confirmation sending unit 704 may be further configured to send to the base station the confirmation of the deactivation using the semi-persistently scheduled uplink resource. Furthermore, the terminal device 700 may further comprise a deactivating unit configured to deactivate the semi-persistently scheduled uplink resource.

In some embodiments, the terminal device 700 may further comprise a second resource obtaining unit configured to obtain an uplink resource from the received indication of uplink SPS deactivation. In these embodiments, the confirmation sending unit 704 may be further configured to send to the base station the confirmation of the deactivation using the obtained uplink resource. In some embodiments, the obtained uplink resource may include one physical resource block.

In some embodiments, the terminal device 700 may further comprise a request sending unit configured to, in response to receiving the indication of uplink SPS deactivation, send to the base station a request for scheduling an uplink resource for the confirmation of the deactivation; and a resource receiving unit configured to receive from the base station the scheduled uplink resource. In these embodiments, the confirmation sending unit 704 may be further configured to send to the base station the confirmation of the deactivation using the scheduled uplink resource.

In some embodiments, the terminal device 700 may further comprise a transmission abstaining unit configured to abstain from the uplink transmission of the stored data.

In some embodiments, the confirmation sending unit 704 may be further configured to send to the base station the confirmation of the deactivation in a Media Access Control (MAC) Control Element (CE). In some embodiments, the MAC CE may have a predefined MAC Protocol Data Unit (PDU) sub-header for identifying the confirmation of the deactivation.

It should be appreciated that units included in the terminal device 700 correspond to the steps of the method 600. Therefore, all operations and features described above with reference to FIG. 6 are likewise applicable to the units included in the terminal device 700 and have similar effects. For the purpose of simplification, the details will be omitted.

The units included in the terminal device 700 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the terminal device 500 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented in a terminal device, comprising:
   receiving from a base station an indication of uplink semi-persistent scheduling deactivation;
   sending to the base station a request for scheduling an uplink resource for the confirmation of the deactivation;
   receiving from the base station the scheduled uplink resource; and
   sending to the base station the confirmation of the deactivation, wherein the sending to the base station of the confirmation of the deactivation comprises:
   using the scheduled uplink resource to send the confirmation; and
   deactivating the semi-persistently scheduled uplink resource.

2. The method of claim 1, further comprising:
   obtaining an uplink resource from the received indication of uplink semi-persistent scheduling deactivation,
   wherein the sending to the base station the confirmation of the deactivation comprises:
   sending to the base station the confirmation of the deactivation using the obtained uplink resource.

3. The method of claim 2, wherein the obtained uplink resource includes one physical resource block.

4. The method of claim 1, wherein the sending to the base station the confirmation of the deactivation comprises:
   sending to the base station the confirmation of the deactivation as a media access control control element.

5. The method of claim 4, wherein the media access control control element is associated with a predefined media access control protocol data unit sub-header for identifying the confirmation of the deactivation.

6. A terminal device, comprising at least one processor and at least one non-transitory memory including computer program code, the at least one memory and the computer program code configured to, with the at least one processor, to cause the terminal device to at least to:

receive from a base station an indication of uplink semi-persistent scheduling deactivation;

send to the base station a request for scheduling an uplink resource for the confirmation of the deactivation;

receive from the base station the scheduled uplink resource; and send to the base station the confirmation of the deactivation, wherein the sending to the base station of the confirmation of the deactivation comprises:

using the scheduled uplink resource to send the confirmation, and deactivating the semi-persistently scheduled uplink resource.

7. The terminal device of claim 6, the at least one memory and the computer program code configured to, with the at least one processor, to further cause the terminal device to at least to:

obtain an uplink resource from the received indication of uplink semi-persistent scheduling deactivation, send to the base station the confirmation of the deactivation using the obtained uplink resource.

8. The terminal device of claim 7, wherein the obtained uplink resource includes one physical resource block.

9. The terminal device of claim 6, the at least one memory and the computer program code configured to, with the at least one processor, to further cause the terminal device to at least to:

send to the base station the confirmation of the deactivation as a media access control control element.

10. The terminal device of claim 9, wherein the media access control control element is associated with a pre-defined media access control protocol data unit sub-header for identifying the confirmation of the deactivation.

11. A computer program product being tangibly stored on a non-transitory computer readable storage medium and including instructions which, when executed with at least one processor, cause a terminal to perform at least the following:

receiving from a base station an indication of uplink semi-persistent scheduling deactivation;

sending to the base station a request for scheduling an uplink resource for the confirmation of the deactivation;

receiving from the base station the scheduled uplink resource; and sending to the base station the confirmation of the deactivation, wherein the sending to the base station of the confirmation of the deactivation comprises:

using the scheduled uplink resource to send the confirmation; and deactivating the semi-persistently scheduled uplink resource.

12. The computer program product of claim 11, wherein the instructions further cause the terminal to perform at least the following:

obtaining an uplink resource from the received indication of uplink semi-persistent scheduling deactivation, wherein the sending to the base station the confirmation of the deactivation comprises:

sending to the base station the confirmation of the deactivation using the obtained uplink resource.

13. The computer program product of claim 12, wherein the obtained uplink resource includes one physical resource block.

14. The computer program product of claim 11, wherein the sending to the base station the confirmation of the deactivation comprises:

sending to the base station the confirmation of the deactivation as a media access control control element.

* * * * *